United States Patent
Simon et al.

(10) Patent No.: US 9,423,319 B2
(45) Date of Patent: Aug. 23, 2016

(54) MODULAR RIGID BARRIER

(71) Applicant: Ford Global Technologies, LLC, Dearborn, MI (US)

(72) Inventors: Rodney Simon, Brighton, MI (US); Jerome Ng, Ann Arbor, MI (US); William McDonald, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 14/293,148

(22) Filed: Jun. 2, 2014

(65) Prior Publication Data

US 2015/0346060 A1 Dec. 3, 2015

(51) Int. Cl.
*E01F 13/00* (2006.01)
*G01M 17/007* (2006.01)
*E01F 15/14* (2006.01)

(52) U.S. Cl.
CPC ........ *G01M 17/0078* (2013.01); *E01F 15/145* (2013.01)

(58) Field of Classification Search
CPC ........ E01F 13/00; E01F 13/02; E01F 13/024
USPC .............................................. 404/6
See application file for complete search history.

(56) References Cited

U.S. PATENT DOCUMENTS

| 3,391,620 | A | * | 7/1968 | Mahoney | E01F 15/006 404/6 |
| 4,004,857 | A | * | 1/1977 | Eschen, Jr. | E01F 15/006 256/13.1 |
| 4,338,041 | A | * | 7/1982 | Schmanski | E01F 7/06 256/13.1 |
| 5,181,695 | A | * | 1/1993 | Arthur | E01F 7/06 256/13.1 |
| 5,244,172 | A | * | 9/1993 | Allega | F16M 13/02 248/161 |
| 5,623,094 | A | * | 4/1997 | Song | G01M 7/08 73/12.04 |
| 7,048,467 | B2 | * | 5/2006 | Burns | E01F 13/123 404/6 |
| 7,101,112 | B2 | * | 9/2006 | Burns | E01F 13/123 404/6 |
| 7,172,176 | B1 | * | 2/2007 | Eastland | E01F 13/022 256/26 |
| 7,494,112 | B2 | * | 2/2009 | Fromm | E01F 13/12 256/64 |
| 8,439,594 | B1 | * | 5/2013 | Clark | E01F 13/12 256/13.1 |
| 8,956,072 | B2 | * | 2/2015 | Brackin | E01F 9/047 404/6 |
| 2014/0314480 | A1 | * | 10/2014 | Heald | E01F 13/048 404/6 |
| 2015/0337509 | A1 | * | 11/2015 | Rainey | E01F 15/083 404/6 |

OTHER PUBLICATIONS

Insurance Institute for Highway Safety; Small Overlap Frontal Crashworthiness Evaluation Crash Test Protocol (Version II), Dec. 2012, 25 pages.
Declaration of Rodney Simon Under 37 C.F.R. §1.132.
Declaration of Jerome Ng Under 37 C.F.R. §1.132.

\* cited by examiner

*Primary Examiner* — Gary Hartmann
(74) *Attorney, Agent, or Firm* — Frank MacKenzie; Bejin Bieneman PLC (57) ABSTRACT

A rigid barrier system includes a base piece and a face piece. The face piece may be configured to be to be mounted to the base piece, such that the face piece is laterally movable while mounted to the base piece in an unfixed mode. Alternatively or additionally, the rigid barrier system may include a steel floor plate resting on a base layer. A mass of the base layer may be at least ten times a mass of the face piece and the base piece.

17 Claims, 11 Drawing Sheets

MODULAR RIGID BARRIER

BACKGROUND

The Small Offset Rigid Barrier (SORB) crash test developed by the Insurance Institute of Highway Safety (IIHS) requires a rigid barrier. In general, a crash test barrier, such as for the SORB crash test, must be of significant mass, and therefore such crash test barriers are generally of significant size and weight, e.g., 250 tons or more. Accordingly, existing crash test barriers are difficult if not impossible to move. However, a crash test facility may wish to use a space for different crash tests, or for different purposes altogether. Further, existing immovable and/or non-portable crash test barriers can consume large amounts of space in a crash test facility. Moreover, because of size, weight, and other limitations, existing barriers do not offer flexibility with respect to positioning and/or replacing a face of a crash test barrier.

DETAILED DESCRIPTION

Figure 1:
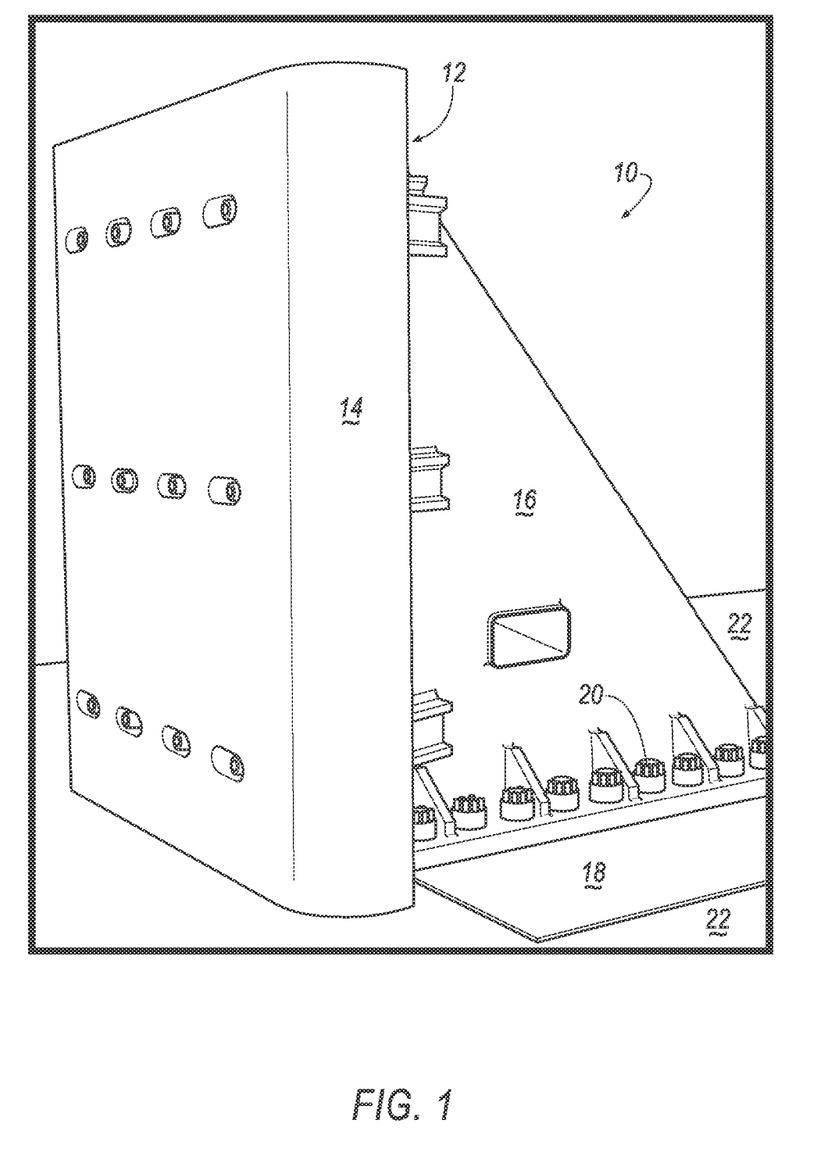
FIG. 1 is a perspective view of an exemplary modular crash test barrier system.
Figure 2:
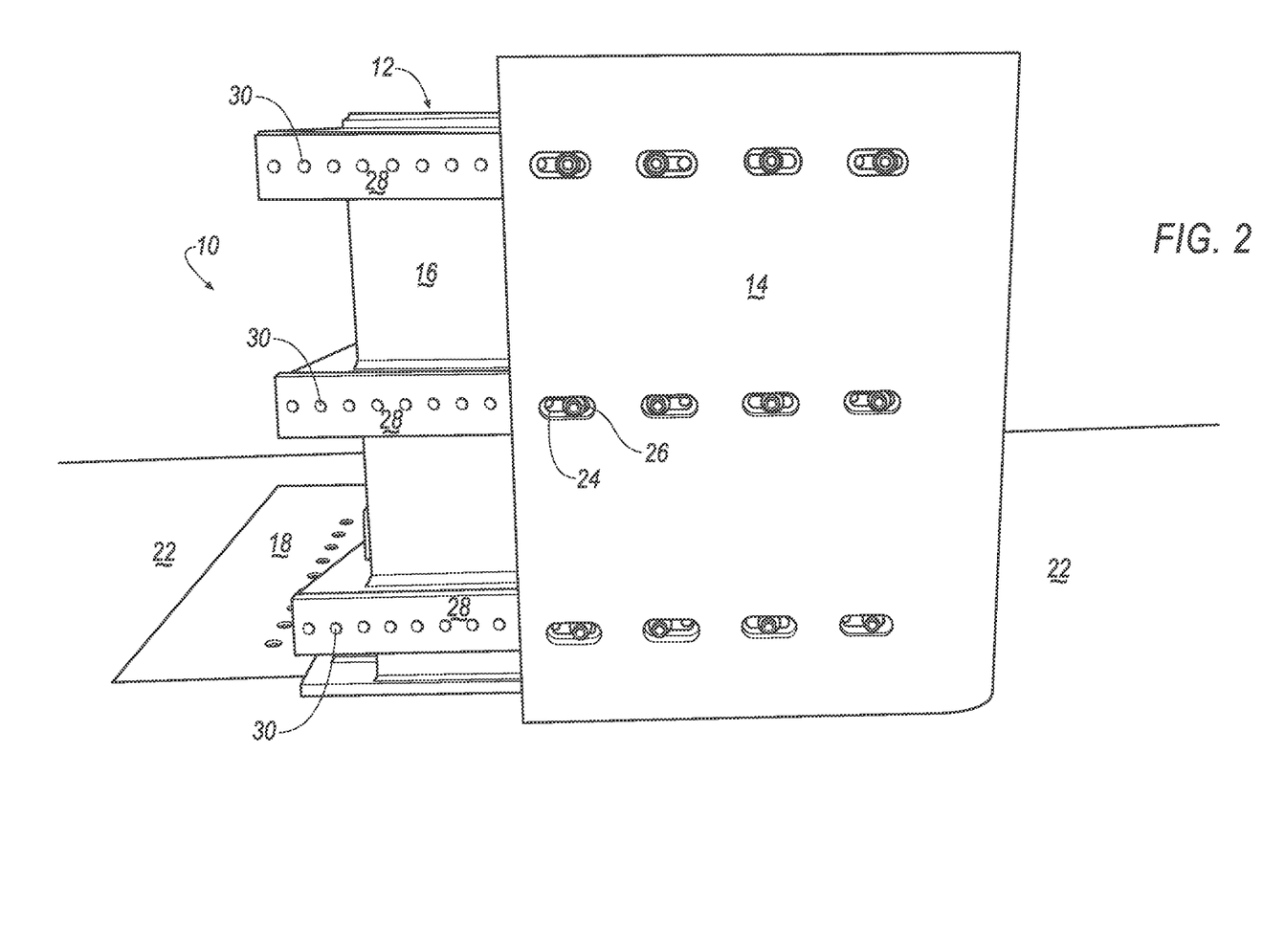
FIG. 2 is a front view of the exemplary system of FIG. 1.
Figure 3:
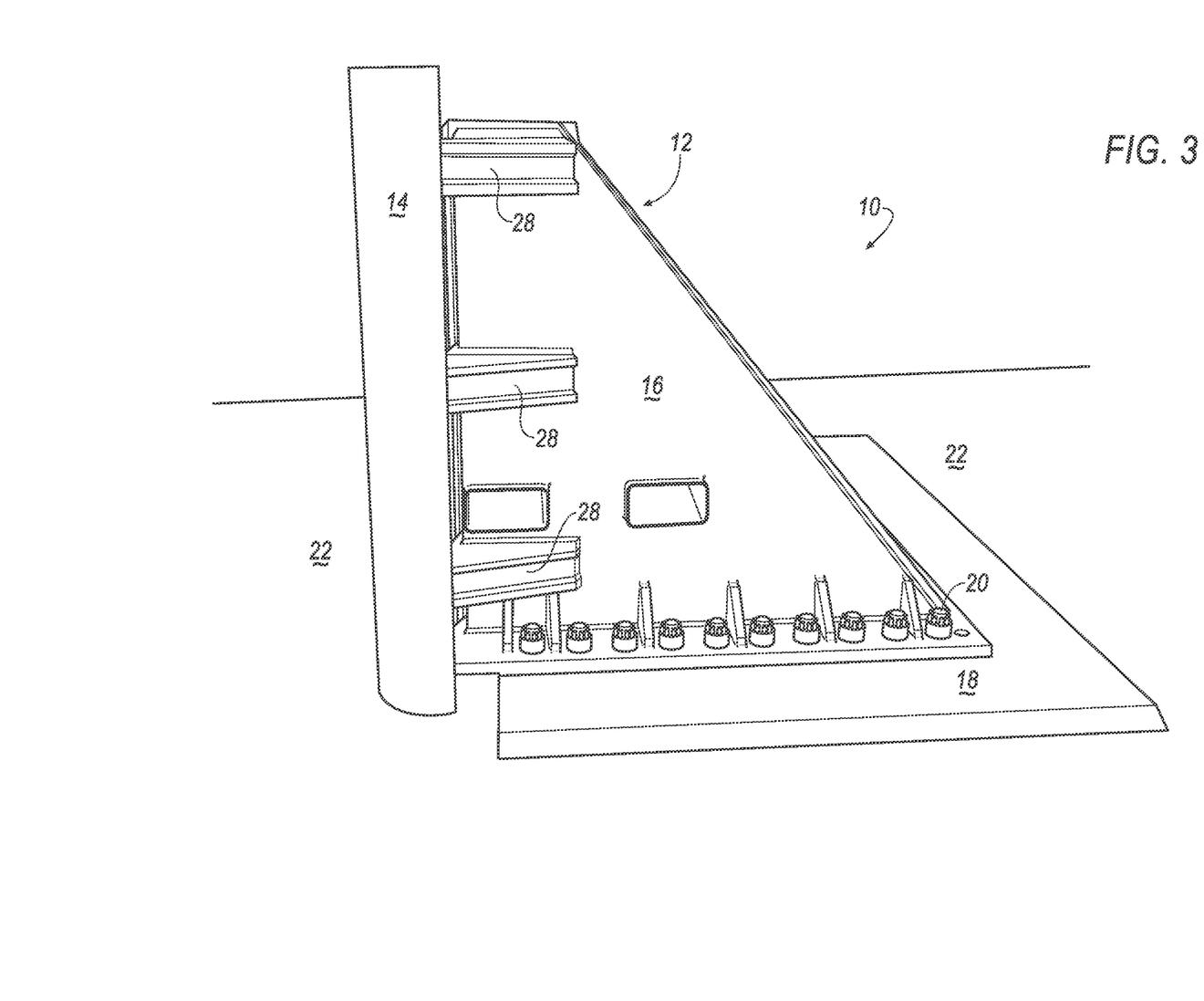
FIG. 3 is a side view of the exemplary system of FIG. 1.

As seen in FIGS. 1-3, a modular crash test barrier system 10 includes a modular rigid barrier 12, which in turn comprises a barrier face piece 14 configured to be mountable on a barrier base (sometimes referred to as an anvil) 16. The barrier 12 may be affixed to a steel plate 18 or the like with a securing mechanism such as bolts 20. As seen, e.g., in FIG. 4, the base piece 16 may include bolt holes 21 for accommodating the bolts 20.

Returning to FIGS. 1-3, also included in the system 10 is a concrete base 22. The barrier 12 may rest on the steel plate 18, which in turn rests on and/or is embedded in the concrete base 22, the plate 18 being retained by a recess of the base 22 that is configured to accommodate the plate 18. Components of the barrier 12, including the face piece 14 and the base 16, and component thereof, are generally constructed of a material of sufficient durability, rigidity, and strength to withstand crash tests, e.g., steel. Further, various components of the face piece 14 and the base 16, including components discussed herein, are generally secured to one another using a mechanism, e.g., welding, of sufficient durability, rigidity, and strength to withstand crash tests.

Figure 11:
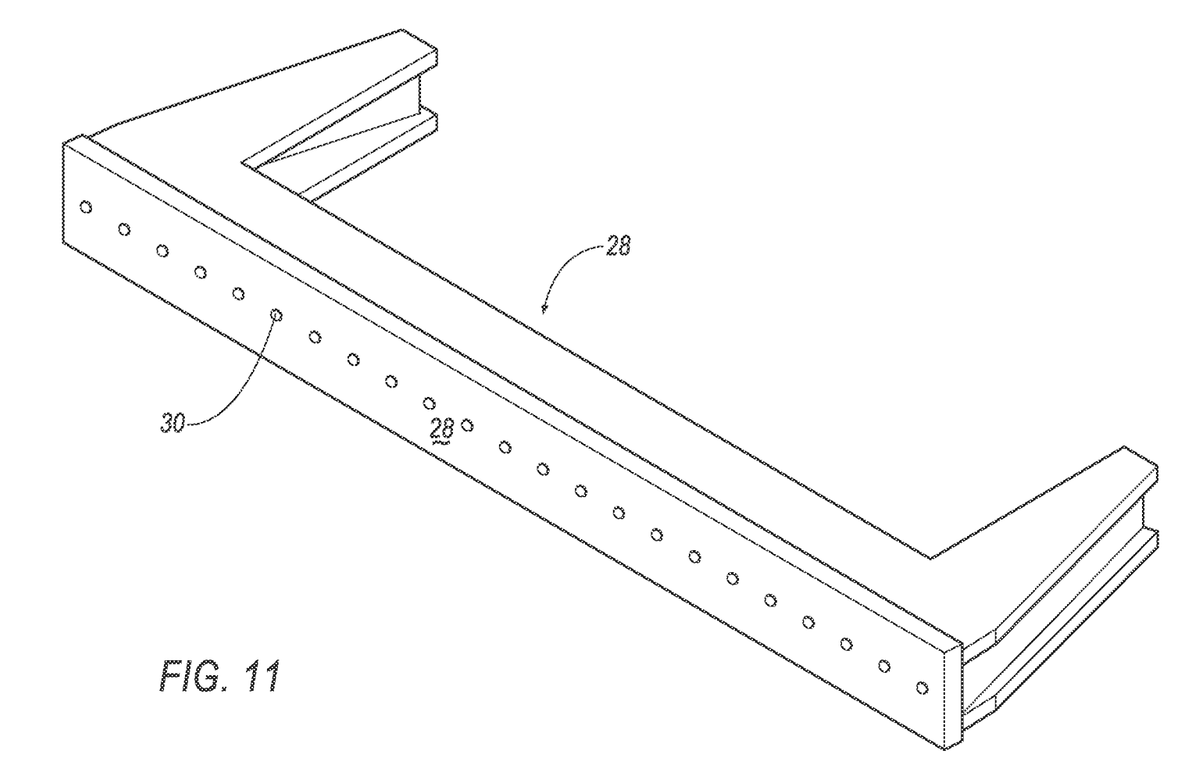
FIG. 11 is a perspective view of an exemplary bracket for a base piece of the exemplary system of FIG. 1.

FIG. 2 provides a front view, and FIG. 3 a side view, of the exemplary crash test barrier system 10 of FIG. 1. As seen in these Figures, the barrier face 14 includes a plurality of bolt openings 24 for accommodating respective bolts 26, by which the barrier face 14 may be secured to brackets or shelves 28 included in the barrier base 16, the shelves 28 generally extending horizontally across a width of the base piece 16 and including a plurality of bolt holes 30 for receiving the bolts 26. FIG. 11 provides a perspective view of an exemplary shelf 28, including a plurality of threaded holes 30. As with other components of the barrier face 14 and base 16, a bracket 28 may be welded to the base 16.

As is further illustrated in FIGS. 2-3, the bolt openings 24 have a generally elongate shape to accommodate lateral movement and positioning of the face piece 14 with respect to the base piece 16. For example, the bolt openings 24 may include a height slightly larger than a diameter of the bolts 26 to accommodate the bolts 26, and may further include a width that is 3 to 4 times a diameter of a bolt 26 head to accommodate lateral movement for positioning the face piece 14. The bolt openings 24 may include flanges or the like such as are conventionally used to provide for the bolt 26 to be tightened, and to secure, the face piece to the base piece 16 in a desired position.

Figure 4:
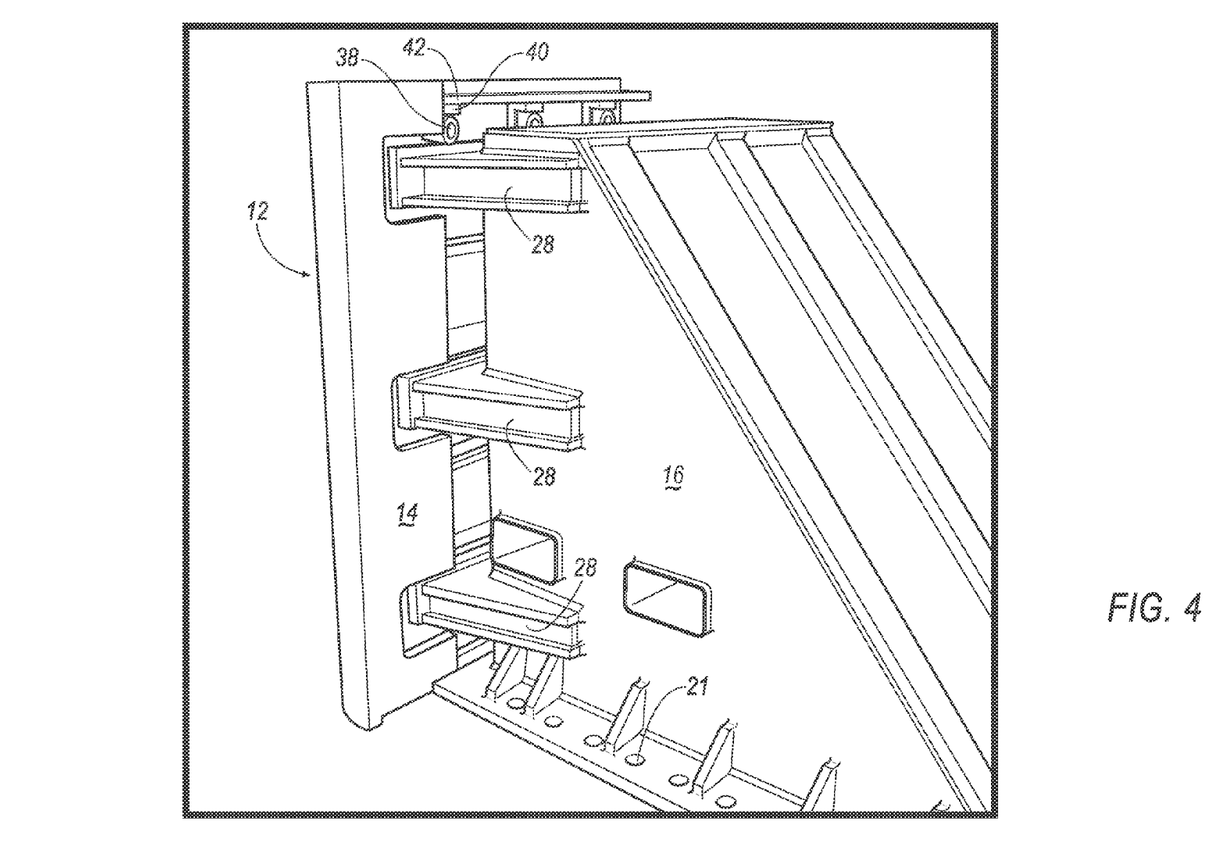
FIG. 4 is a rear perspective view of the exemplary system of FIG. 1.
Figure 5:
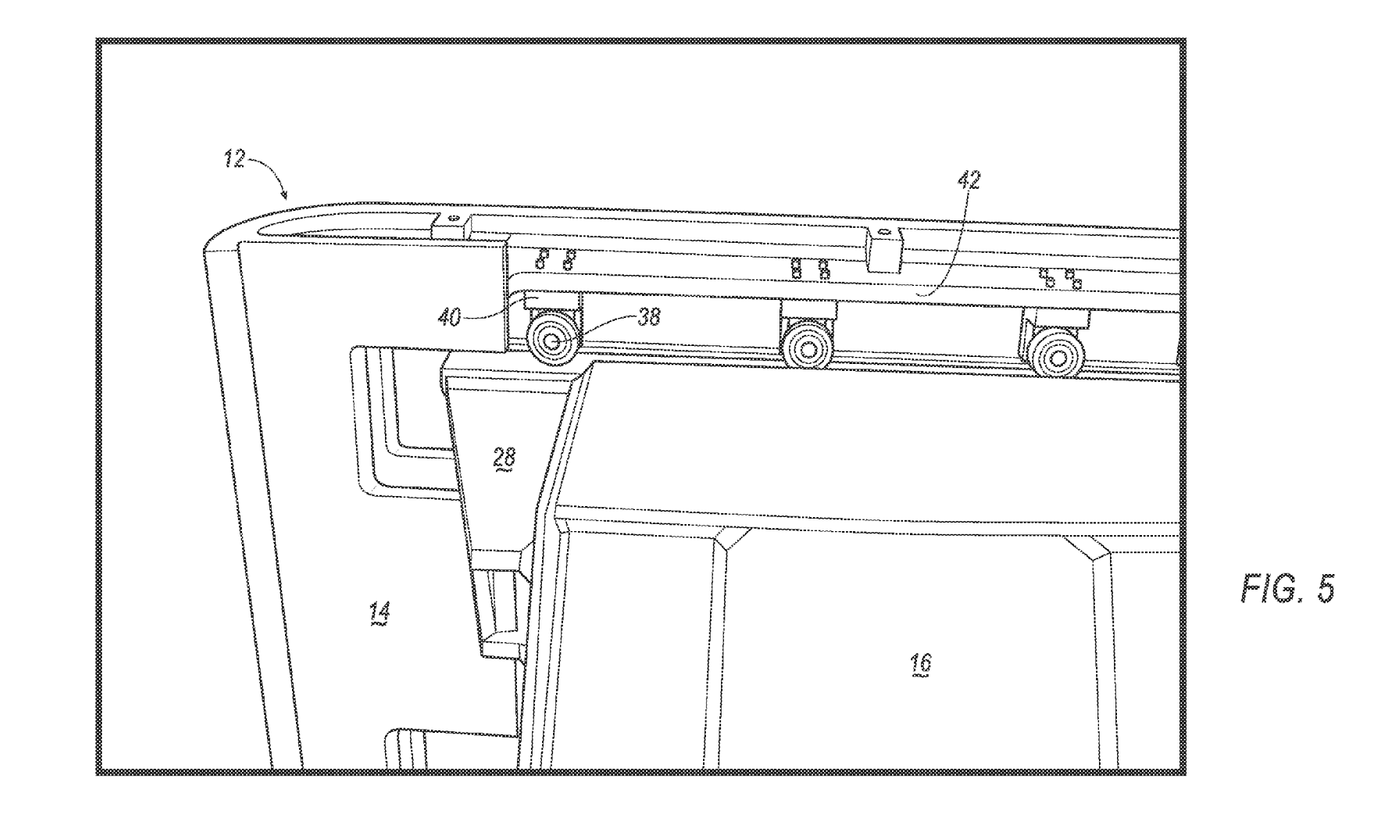
FIG. 5 is a rear perspective view of a portion of a modular crash test barrier of the exemplary system of FIG. 1.

Accordingly, as illustrated in FIGS. 4 and 5, the face piece 14 may be provided with cams or wheels 38 with which the face piece 14 is mounted on a top shelf 28 of the base piece 16. Accordingly, the face piece 14 may be secured to the base piece 16 (e.g., including as described below with respect to FIGS. 6 and 7), and then the face piece 14 may be moved laterally, e.g., from left to right in the perspective of FIG. 2, until a desired positioning of the face piece 14 with respect to the base piece 12 is achieved.

Figure 6:
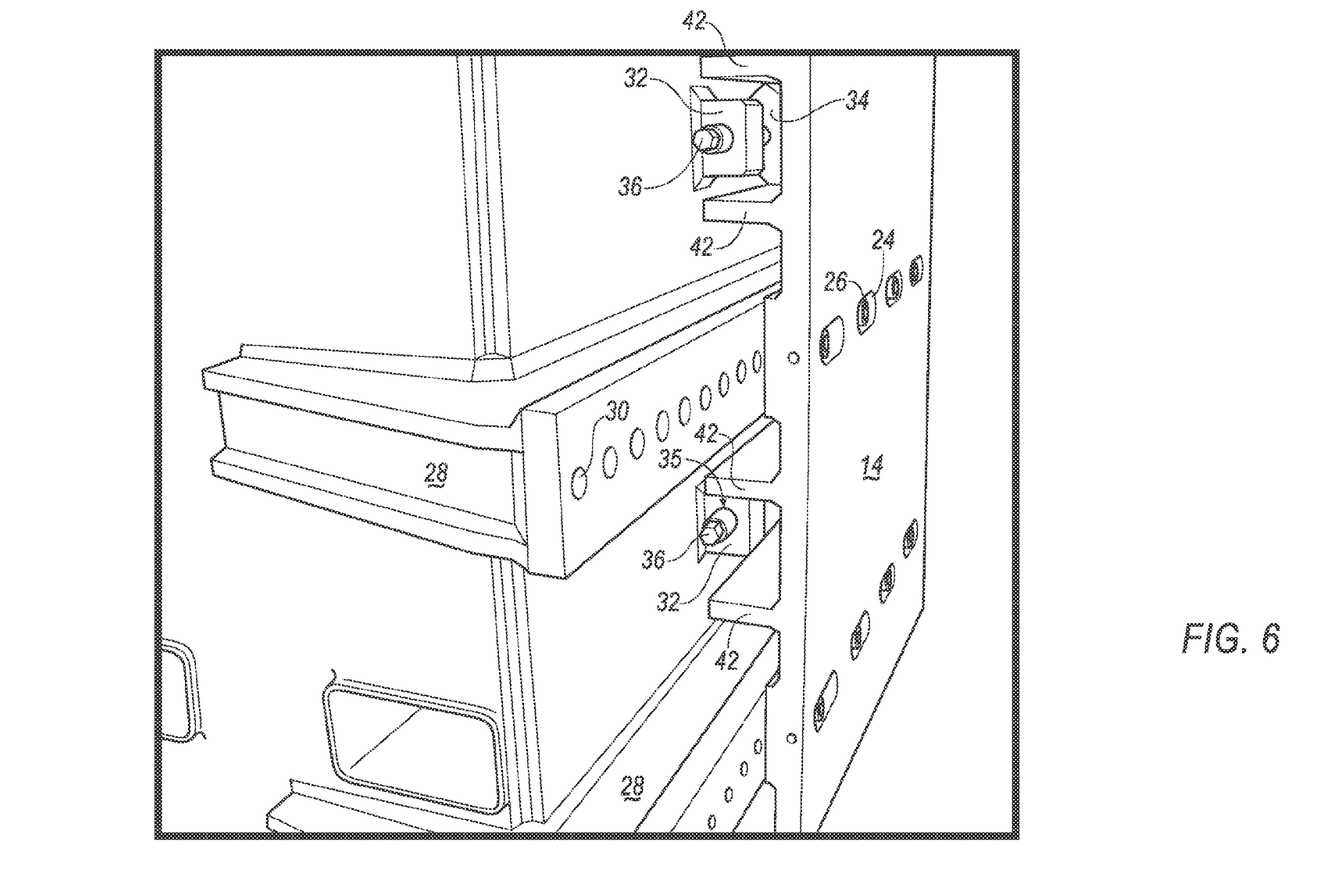
FIG. 6 is a side perspective view of a portion of a modular crash test barrier of the exemplary system of FIG. 1.
Figure 7:
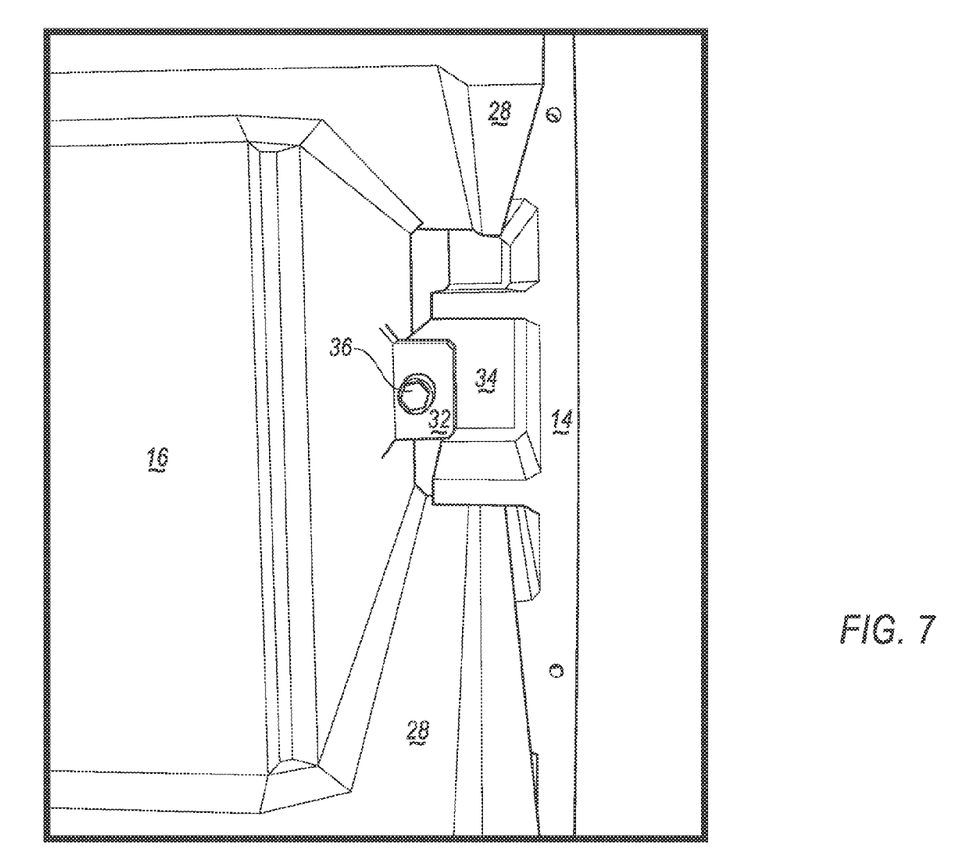
FIG. 7 is a side view of a portion of a modular crash test barrier of the exemplary system of FIG. 1.
Figure 8:
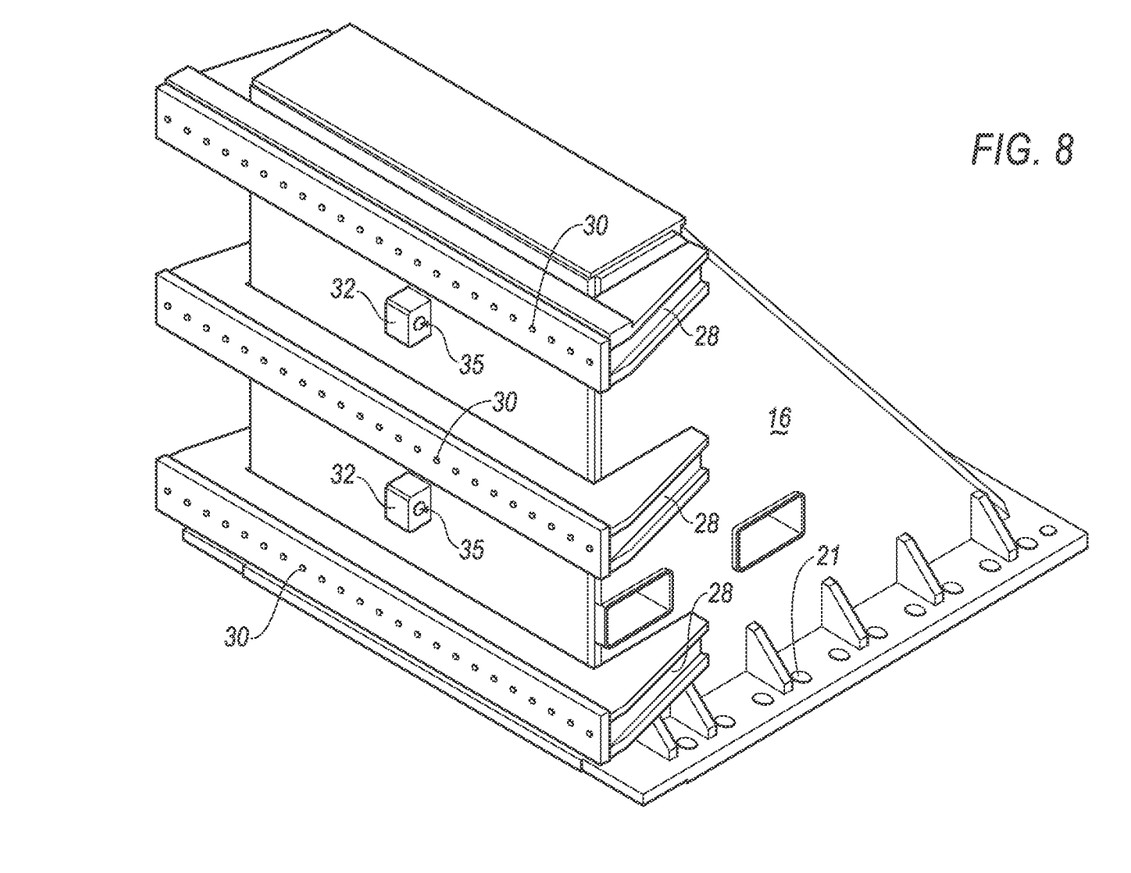
FIG. 8 is a perspective view of an exemplary barrier base of the exemplary system of FIG. 1.
Figure 9:
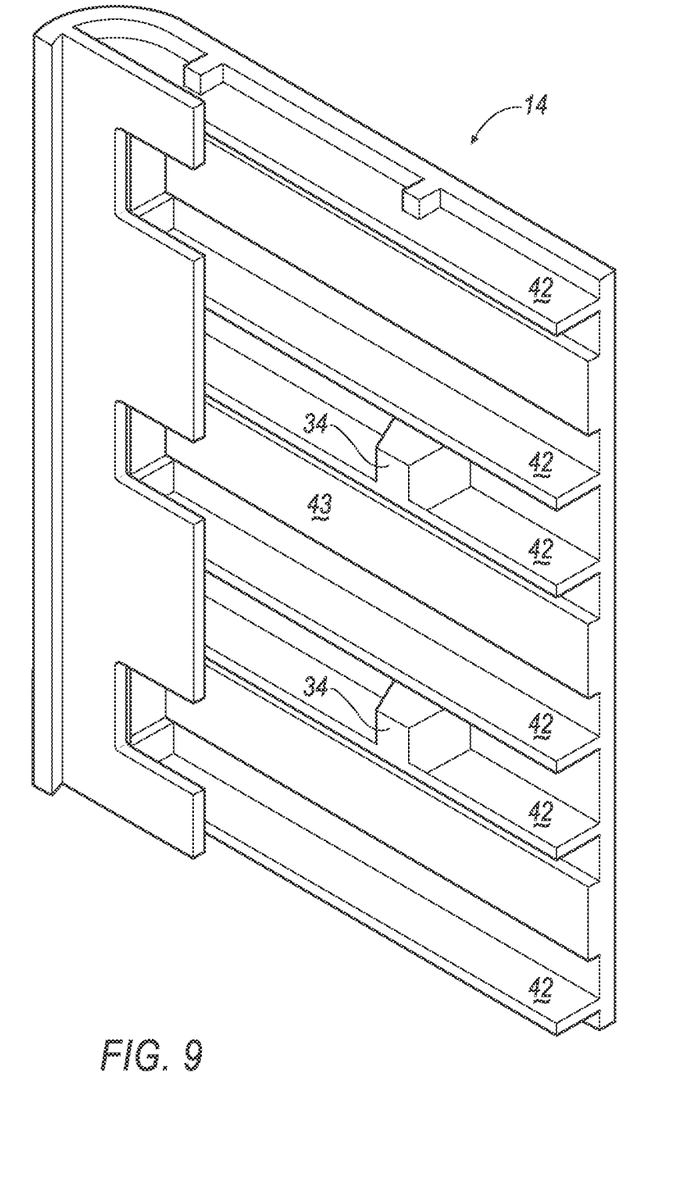
FIG. 9 is a perspective view of an exemplary barrier face of the exemplary system of FIG. 1.

FIG. 6, a side perspective view of a portion of a modular crash test barrier 12, and FIG. 7, a side view of the barrier 12, further illustrate a manner in which the face piece 14 may be secured and positioned when mounted on the base piece 16. The illustration of FIG. 6 may be better understood by first referring to FIGS. 8 and 9. As seen in FIG. 8, a perspective view of an exemplary base 16, the base 16 may include mounting blocks 32 affixed, e.g., welded, to a front face thereof. The mounting blocks 32 include threaded holes 35 for receiving a threaded bolt 36 (shown in FIG. 6). Further, as seen in FIG. 9, a back side 43 of the face piece 14 may include one or more stop blocks 34, e.g., mounted on a rib or respective ribs 42 that extend laterally across, i.e., across all or part of a width of, the back side 43 of the face piece 14.

Thus, as seen in FIGS. 6 and 7, when the face piece 14 is mounted on the base 16, the bolts 26 may be threaded into the holes 30 of one or more shelves 28, but not completely tightened against a flange or wall of respective openings 24 accommodating each of the bolts 26. Accordingly, the face 14 may be secured onto the base 16, with the cams 38 extending downward from respective cam brackets 40 that are secured, e.g., welded, to a top rib 42 of the face piece 14, the cams 38 resting on an upper surface of a top shelf 28 of the base 16. Further, the bolt 36 may be threaded into the hole 35. As the bolt 36 is turned, an end of the bolt 36 may push against the stop block 34, thereby moving and positioning the face piece 14. Alternatively or additionally, the face piece 14 may be moved laterally, e.g., by a person causing the face piece 14 to roll on the cams 38, until the face piece 14 is stopped by the end of the bolt 36. Once the face piece 14 is positioned with the bolt or bolts 36 and or ends positioned against a block or respective blocks 34, bolts 26 may be tightened, fixing a position of the face 14 on the base 16, i.e., placing the face 14 in a fixed mode with respect to the base 16 from an unfixed mode, i.e., a state where the bolts 26 are not completely tightened.

Figure 10:
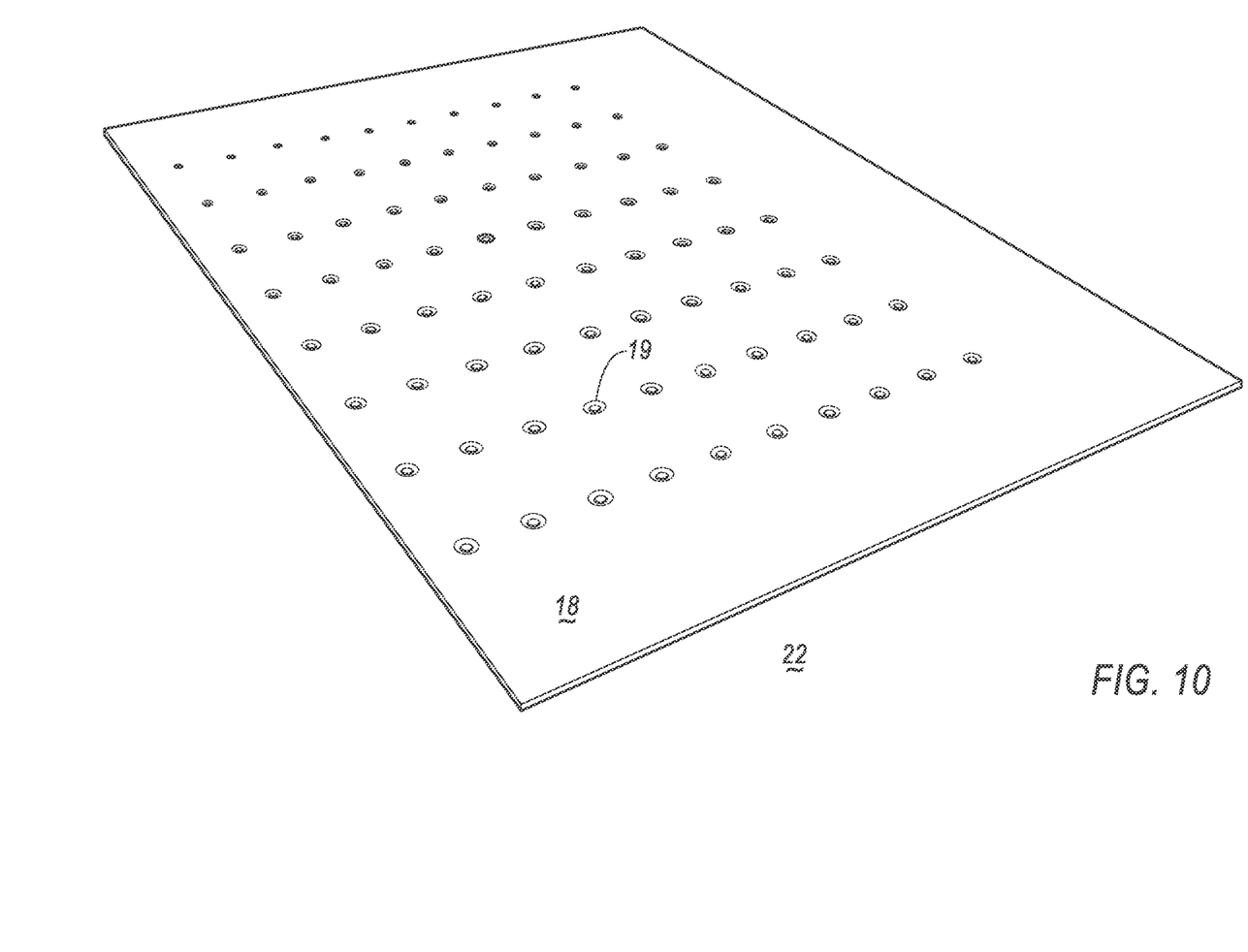
FIG. 10 is a perspective view of a steel plate and concrete floor of the exemplary system of FIG. 1.

FIG. 10 illustrates the steel plate 18 arranged in a recess of the floor base 22, which is concrete in an exemplary embodiment. In this example, the steel plate 18 is at least three inches thick, and is welded to steal I-beams that are embedded in the base 22. The base 22 in turn, in this example, is six feet thick. As seen in FIG. 10, the steel plate 18 includes a plurality of bolt holes 19 for accommodating floor bolts 20. Because of the severe loads and stresses of a crash test, specialized bolts are usually used for the floor bolts 20. In one example, the bolts 20 are SUPERBOLTS® sold by NORD-LOCK® Inc. of Carnegie, Pa. Providing a plurality of bolt holes 19 in the steel plate 18 advantageously allows for varying a placement of the barrier 12 with respect to a test track or the like.

Further, the modular barrier 12 advantageously is considerably lighter than conventional barrier structures, and accordingly is portable, e.g., can be safely and easily moved about a crash test facility using a single forklift or the like. In one example, the modular barrier 12, including the face 14 and base 16 weighs approximately 4 tons. In conventional systems, in contrast, a crash test barrier structure could weigh 250 tons or more, and thus have a corresponding mass. Further, in a conventional system, as in the presently disclosed system 10, the base 22 could weigh 250 tons or more, with a corresponding mass. Accordingly, in the system 10, the base 22 can have a mass that is ten times or more greater than a mass of the moveable rigid barrier 12. For example, in one implementation, the mass of the base 22 is approximately one hundred time greater than a mass of the moveable rigid barrier 12. Moreover, by advantageously providing an interchangeable face 14 mountable on the base 16 in the movable modular barrier 12, the system 10 can be relocated to various areas of a crash test facility.

Further, as just mentioned, the face 14 may be interchangeable on the base 16. That is, note that the base piece 16 is configured to accommodate one or more second barrier faces in addition to the barrier face 14 illustrated herein. For example, the plurality of holes 30 in each of the shelves 28 may be configured to accommodate a variety of different faceplates such as may be warranted for different respective crash tests. Accordingly, one example of the system 10 includes a modular rigid barrier 12 in which a first barrier face piece 14 may be interchanged with one or more second barrier face pieces.

As used herein, the adverb "substantially" modifying an adjective means that a shape or structure may deviate from an exact described geometry because of imperfections in materials, machining, manufacturing, etc. Further, the term "exemplary" is used in the sense of signifying an example, e.g., a reference to an "exemplary widget" should be read as simply referring to an example of a widget.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A rigid barrier system, comprising:
a steel floor plate resting on a base layer; and
a modular barrier that includes a base piece configured to be affixed to and extend upwardly from the floor plate and a face piece including a substantially flat face and configured to be to be horizontally movably mounted to the base piece.

2. The rigid barrier system of claim 1, wherein the face piece is laterally movable while mounted to the base piece in an unfixed mode.

3. The rigid barrier system of claim 1, wherein the face piece is laterally fixed while mounted to the base piece in a fixed mode.

4. The rigid barrier system of claim 1, wherein the floor plate is composed of steel and the base layer is composed of concrete.

5. The rigid barrier system of claim 1, wherein the floor plate includes a plurality of holes for accommodating bolts securing the base piece, whereby the modular barrier may be moved and positioned in a plurality of locations with respect to the floor plate.

6. The rigid barrier system of claim 1, wherein the base layer includes a recess configured to retain the floor plate.

7. The rigid barrier system of claim 1, wherein a mass of the base layer is at least ten times a mass of the modular barrier.

8. The rigid barrier system of claim 1, wherein the base piece includes a front face extending transversely relative to the floor plate.

9. The rigid barrier system of claim 8, wherein the base piece includes a bottom face facing and contacting the floor plate.

10. The rigid barrier system of claim 9 wherein the front face of the base piece extends from an edge of the bottom face of the base piece.

11. The rigid barrier system of claim 10, wherein the base piece includes a plurality of reinforcing plates extending from the bottom face to the front face of the base piece.

12. The rigid barrier system of claim 1, wherein the base piece includes at least one bracket extending horizontally across a width of the base piece, the at least one bracket including a plurality of threaded holes for receiving bolts to secure the face piece to the base piece.

13. The rigid barrier system of claim 12, wherein the face piece includes a plurality of cams that rest on an upper face of the at least one bracket, whereby horizontal movement of the face piece can be accomplished by rolling the face piece on the cams.

14. The rigid barrier system of claim 1, wherein the base piece includes at least one mounting block having a threaded hole and extending from a front face of the base piece.

15. The rigid barrier system of claim 14, wherein the face piece includes at least one stop block extending from a back face thereof.

16. The rigid barrier system of claim 15, wherein the mounting block and the stop block are configured such that, when the face piece is mounted to the base piece, a bolt inserted into the threaded hole can be adjusted to contact the stop block, thereby horizontally positioning the face piece on the base piece.

17. The rigid barrier system of claim 1, further comprising a second face piece configured to be mounted to the base piece.

\* \* \* \* \*